(12) United States Patent
Knopf et al.

(10) Patent No.: US 8,023,242 B2
(45) Date of Patent: Sep. 20, 2011

(54) CIRCUIT ARRANGEMENT WITH A RELAY INCORPORATING ONE FIELD COIL AS WELL AS SWITCH CONTACTS

(75) Inventors: Hannes Knopf, Kassel (DE); Andreas Jeppe, Witzenhausen (DE); Burkard Mueller, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 141 days.

(21) Appl. No.: 12/485,079

(22) Filed: Jun. 16, 2009

(65) Prior Publication Data

US 2009/0316323 A1 Dec. 24, 2009

(30) Foreign Application Priority Data

Jun. 18, 2008 (EP) ...................................... 08011018

(51) Int. Cl.
*H01H 9/00* (2006.01)

(52) U.S. Cl. ...................................... 361/139; 361/160

(58) Field of Classification Search .................. 361/139, 361/160
See application file for complete search history.

(56) References Cited

U.S. PATENT DOCUMENTS

| 4,257,081 A | 3/1981 | Sauer et al. |
| 6,148,781 A * | 11/2000 | Boegner et al. ............. 123/179.3 |
| 6,291,764 B1 * | 9/2001 | Ishida et al. ................... 322/2 R |
| 6,963,147 B2 * | 11/2005 | Kurokami et al. ............. 307/154 |
| 2003/0094858 A1 | 5/2003 | Shiue et al. |

FOREIGN PATENT DOCUMENTS

| DE | 27 47 607 A1 | 4/1979 |
| EP | 0807948 A2 | 11/1997 |
| WO | 2007/031356 A1 | 3/2007 |

* cited by examiner

*Primary Examiner* — Danny Nguyen
(74) *Attorney, Agent, or Firm* — Eschweiler & Associates, LLC

(57) ABSTRACT

The invention is directed to a circuit array with a relay (K1; K12) incorporating a field coil (E) as well as a switch contact (1a, 1b), said switch contact (1a, 1b) being provided as a switch point between a grid, in particular a mains supply (N), and an inverter (WR) fed by a direct voltage source, in particular by a photovoltaic generator (PVG), said relay (K1; K12) being configured to be a bistable relay.

20 Claims, 5 Drawing Sheets

CIRCUIT ARRANGEMENT WITH A RELAY INCORPORATING ONE FIELD COIL AS WELL AS SWITCH CONTACTS

BACKGROUND OF THE INVENTION

The invention relates to a circuit arrangement with a relay incorporating a field coil as well as switch contacts, the switch contacts being provided as a switch point between a grid, in particular a mains supply, and an inverter fed from a direct voltage source, in particular from a photovoltaic generator.

Specially devised inverters for photovoltaic plants are known, which have a semiconductor bridge circuit for feeding into a mains supply made from photovoltaic generators. Such a mains supply may be the utility grid or an isolated network. The photovoltaic inverter ensures that the direct current of the source is converted into an alternating current (AC) conforming to the mains.

Such type inverters for feeding into a mains supply are subject to particular demands. They must meet safety regulations, which may vary from one country to another. What is particularly safety-relevant in almost any country is removing the photovoltaic plant, inclusive of the generator and of the inverter, from the grid.

In both sides of AC lines, switches are usually utilized. Due to the magnitude of the current to be switched and to galvanic separation, one uses switch components with switch contacts, in particular with relays.

One problem is that the switch contacts of the relays may get soldered or glued together under certain circumstances, e.g., through failures in the grid. In order to limit this safety risk, it is known to utilize two relays instead of only one so that their switch contacts are connected in series. This series connection is illustrated in FIG. 2.

Whilst dimensions and weight of photovoltaic inverters have remained widely constant over the years, the possible infeed power of the inverters increases considerably in parts. This places a new demand on the component parts used in the inverter. The relays used in the disconnection points should have a space-saving, that is small, configuration and consume little energy.

In conventional inverters one typically utilizes monostable relays for the disconnection points mentioned.

In the unexcited state, such type relays have precisely one, firmly defined switch position. In the normally open type, the contact is for example always open as long as no current flows through the relay coil. Then, closing requires a supply of current. If the switch is mostly closed, it is advantageous to utilize a normally closed type of switch.

On the normally closed type, the contact is closed as long as no current flows through the relay coil. The disadvantage thereof is that it must be supplied with current to be in the opened condition. Accordingly, the normally closed type involves a safety risk. If the current supply fails, the photovoltaic plant cannot be disconnected from the grid.

Moreover, monostable relays suffer from another disadvantage. For one of the two switch conditions, i.e., for opened or closed switch contacts, a permanent current flow is needed. This requires a coil of corresponding size. As a result, the relay is large and expensive.

This is disadvantageous for photovoltaic inverters for feeding into a mains supply. Such type inverters should be low-cost, small and safe, they should consume little energy for their own supply for the efficiency of the plant to be as high as possible.

On the other side, these relays also have advantages. They have simple mechanics, are low-cost and allow for defined basic state of the relay. Moreover, actuation is very simple. If current is interrupted through the field coil, the relay switches.

Bistable relays are known.

In principle, bistable relays meet the demands for little additional space and for low energy consumption. Bistable relays only need a timely limited current pulse in order to change the switch state, in which they then remain. Power is only needed for the switch-over pulse. This is the reason why they need considerably less energy than monostable relays. In contrast to monostable relays, no constant current must flow through the coil in order to keep the relay in an opened or closed position. Since there is no permanent current flow, the field coil does not heat up. A small coil is needed so that the relay itself is small also.

A trigger circuit is known from DE 2747607 C3 in order to also use for monostable switching the advantages of bistable relays such as e.g., low excitation power and lack of unnecessary heating, poor thermoelectric voltage, increase in reliability even of neighbouring component parts and temperature compensation of the excitation voltage. A known arrangement is shown in FIG. 3.

By adding an excitation voltage U to the circuit, the bistable relay R1s is excited and a capacitor C1 is charged at the same time. The relay R1s then switches on. If the capacitor C1 is charged, the current flow stops. By virtue of its bistable property, the relay R1s however remains in its switch position. For switching back by switching the excitation voltage U off, the capacitor C1 discharges via a semiconductor path with a transistor T1 connected in parallel to the relay. The relay R1s is excited in the opposite direction and returns in its position of rest like a monostable relay. In this way, it is possible to operate the relay R1s with minimum trigger energy.

BRIEF SUMMARY OF THE INVENTION

It is the object of the invention to provide a space and energy saving switch point, in particular for a photovoltaic inverter, using a relay. This improved solution is intended to have only a few component parts. The relay is intended to switch off securely, also automatically in the event of a fault.

This object is achieved in that the relay is configured to be a bistable relay, the field coil being connected, in accordance with a preferred embodiment, in series with at least one switch and one capacitor so that the capacitor is charged when the at least one switch is switched on.

The invention makes use of the principle explained in DE 2747607 C3 and widens it by adding important functions that are safety-relevant for photovoltaic engineering.

The trigger circuit of the invention for the relay offers the following advantages.

The relay is only operated after secure buffering of a sufficiently high a charge for switch off operation.

The charge current is limited so that excessive charging of the component parts is avoided.

The relay can open when the supply voltage drops.

Secure opening of the relay is possible in the event of a sudden component failure.

In the invention a capacitor, which is series-connected with respect to the field coil of the relay, is charged.

Other advantageous implementations of the invention are recited in the dependent claims.

An advantage is obtained if a charge current path for charging the capacitor is connected parallel to the field coil.

This preferred solution relies on the idea to separate the charging of the capacitor from the excitation of the relay. For this purpose, a switch is mounted in series with respect to the field coil of the relay. Parallel to the series-connection consisting of the field coil and of the switch there is the electric current path or charge current path through which the capacitor is charged. This makes it possible for the capacitor to be charged to a given voltage, the switch, which is mounted upstream of the relay, then switching on. As a result, a current flows through the field coil of the relay and the relay switches. This process takes place if the relay, and as a result thereof the switch point between the inverter for feeding into a mains supply and the mains, closes.

In the way described, it is made certain that, even before the relay closes, enough energy is stored in the capacitor to switch the relay over, meaning to switch it off and to thus disconnect the inverter from the mains supply. This is a major safety aspect for the use of the relay in the switch point.

During opening, the capacitor discharges so that a current can flow through the field coil and for example an antiparallel diode of the switch mounted in series with respect to the field coil. The discharging current is contrary to the charging current so that the rotating armature of the relay tilts.

Further, a resistor can be provided in the charge current path. This resistor acts so as to limit the current during the charging phase so that the magnitude of the charge current can be set via the resistance value.

In an advantageous developed implementation of the circuit arrangement of the invention there is provided that a second switch is disposed in the charge current path for interrupting said path when the capacitor has been charged to a defined value. The switch of the charge current path is preferably a semiconductor switch, in particular a MOSFET. A very simple and low-loss triggering of the MOSFET lying in the charge current path makes it possible to switch off the charge current of the capacitor in a defined manner. As a result, an amount of energy needed for opening the relay can be fixed exactly and excessive charging of the component parts can be avoided.

A trigger circuit for the switch or MOSFET lying in the charge current path is advantageous, said circuit being configured such that a trigger signal applies at the switch so that the switch, which is connected in series with respect to the field coil, is only switched on when the capacitor is charged to a defined value. The trigger signal can be formed by simple component parts such as resistors and diodes. Switching the switch mounted in series with respect to the field coil causes the relay to close at a defined voltage.

More specifically, a defined capacitor voltage becomes possible if there is provided at least one zener diode for controlling the charging process, which is connected to another switch. By selecting suited zener diodes and a suited voltage level of the zener diode the capacitor voltage can be fixed in a simple way.

In another preferred embodiment of the invention, an additional switch in the form of a change over switch for switching between the supply voltage and ground is connected in series with respect to the switch, the field coil and the capacitor. In the initial position of this switch the circuit arrangement is connected to ground. By closing this switch, the circuit arrangement is supplied with a voltage.

It is advantageous if the change over switch is integrated in an IC driver module. Other component parts may also be integrated into an IC driver module so that a very compact circuit is obtained.

In order to further improve the efficiency of the circuit, it is advantageous that the switch, which is connected in series with respect to the field coil, is a semiconductor switch, in particular a MOSFET.

Very simple activation with a small number of component parts can be realized if a series connection consisting of a resistor, an additional switch and a diode is connected in parallel to the switch and to the field coil lying in the current path of the relay coil.

In a preferred solution of the circuit arrangement of the invention, there is advantageously provided that the switch, which is connected to the zener diode mentioned, is a semiconductor switch, preferably a MOSFET, drain and gate of this switch being connected together through a resistor and a zener diode being connected between gate and source in such a manner that its cathode is connected to the gate and its anode to the source. As a result, a defined capacitor voltage, which is important for switch-off operation, can also be realized. Triggering the switch lying in the relay path occurs separately by another switch, in particular by a npn transistor so that the switch can be triggered through a semiconductor switch, in particular through the npn transistor, which can be triggered through another zener diode, said zener diode being connected to a gate of a switch lying in the charge current path. It is advantageous hereby that the direct switch of the relay coil is a p channel MOSFET.

In a variant of the circuit arrangement of the invention, a discharge current of the capacitor flows through a complementary Darlington circuit consisting of two switches. The Darlington circuit is very low loss and provides high efficiency. Simple actuation may occur in that a resistor is connected in series with a diode and with the field coil on a supply voltage, the cathode of the diode being connected to the collector of the first switch of the Darlington circuit.

Instead of connecting the switch lying in the relay path on a positive side directly in series with the field coil, it is alternatively also possible that this switch of the capacitor is arranged between the capacitor and ground. As a result, safe contact opening of the relay is possible.

The invention is also directed to an inverter having a circuit arrangement of the type described above.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 4:
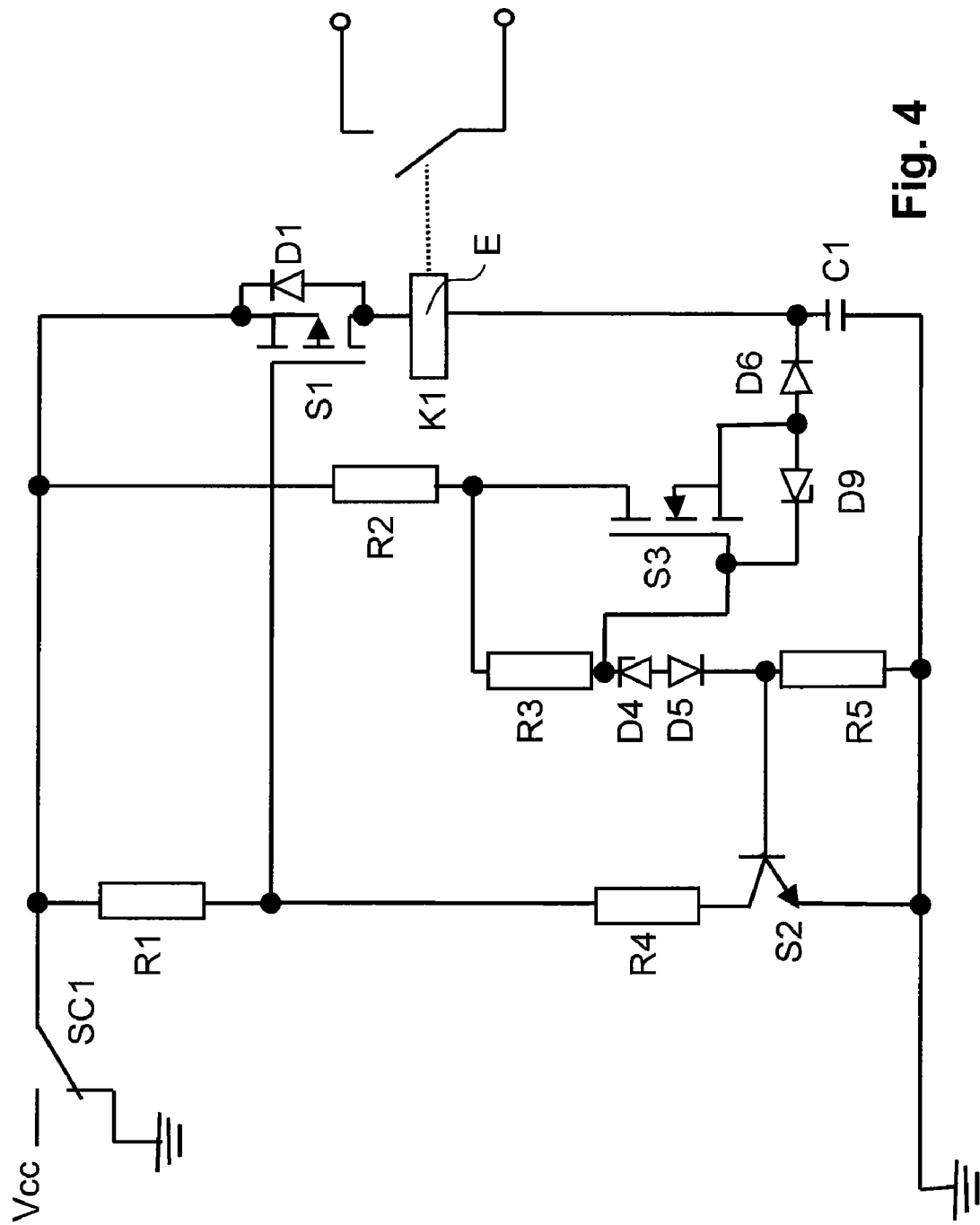
FIG. 4 shows a first exemplary embodiment of the circuit array of the invention and FIG. 5 shows a second exemplary embodiment of the circuit array of the invention.
Figure 5:
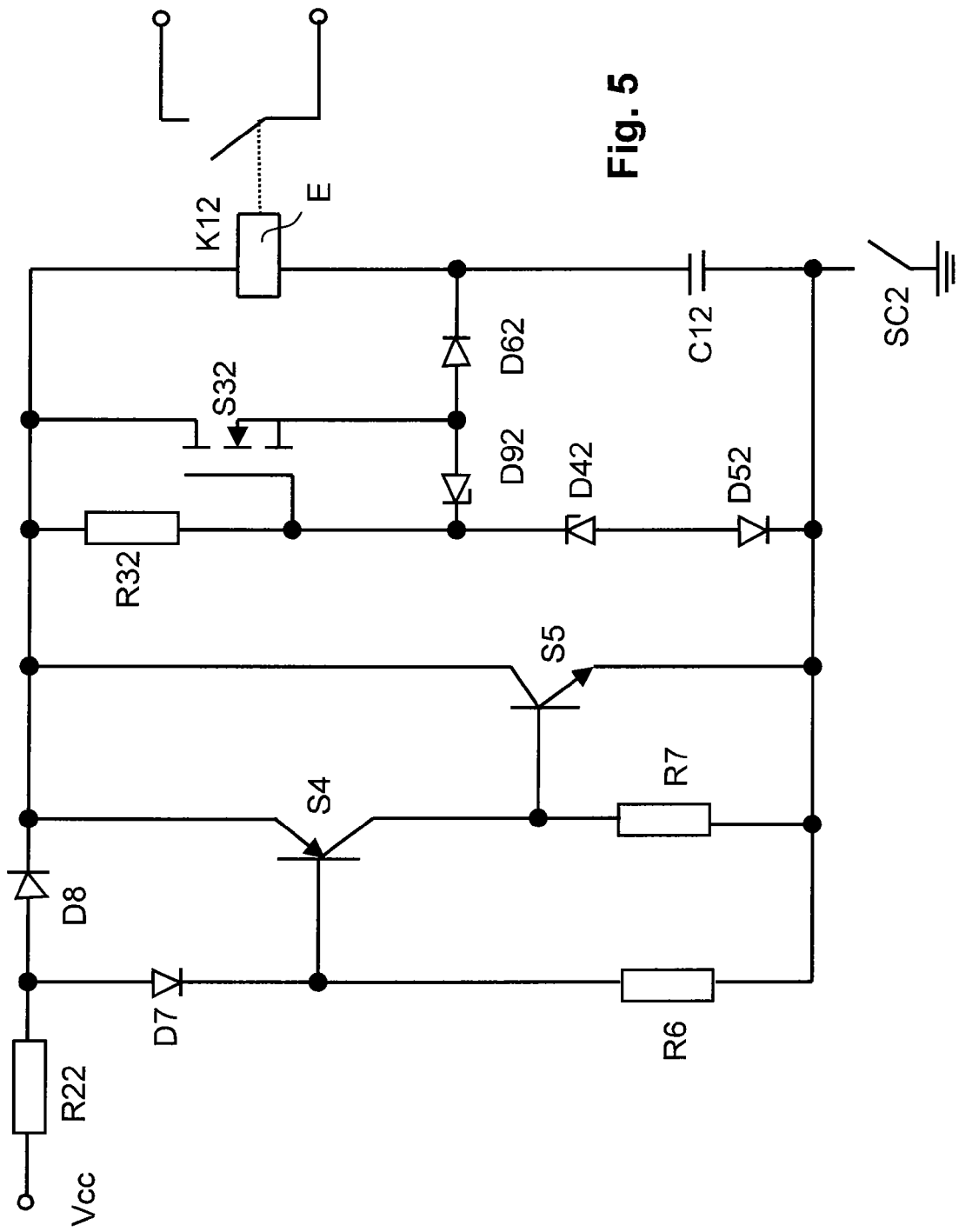

In the Figs. like components will bear the same or similar numerals. In FIG. 5, components, which are comparable to those in FIG. 4, are identified by the same reference number with the addition of an index "2". Accordingly, the resistor R2 in FIG. 4 corresponds to the resistor R22 in FIG. 5.

Figure 1:
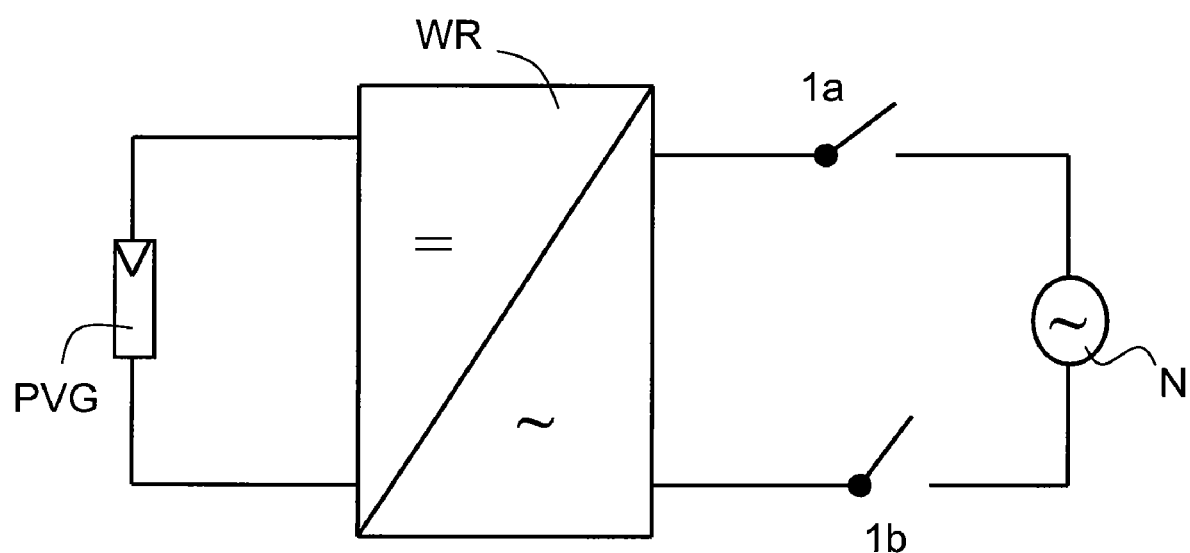
FIG. 1 shows a schematic illustration of a photovoltaic inverter that is connected to a photovoltaic generator and that may be connected to a mains supply through relay contacts.

In FIG. 1, there is illustrated a photovoltaic inverter WR that is connected to a photovoltaic generator PVG and that may be connected to a mains supply N through relay or switch contacts 1a, 1b of a bistable relay.

The bistable relay is connected to a trigger circuit. The contacts 1a, 1b form a switch point of the inverter WR for feeding into the mains supply N from the photovoltaic generator PVR. The photovoltaic inverter WR converts the DC voltage of the generator PVG into an alternating current, which conforms to the grid, of e.g., 50 Hz or 60 Hz. An isolated network may also be provided instead of a mains supply.

The switch point is in particular a switch point located on the mains side between the inverter WR and the grid. The contacts 1a, 1b are interposed between the inverter WR and the grid N. Alternatively, the contacts 1a, 1b may be interposed between the inverter and the photovoltaic generator PVG.

Through this switch point, it is possible to disconnect the photovoltaic plant so that safety regulations can be met.

In both AC lines, one utilizes switch contacts 1a, 1b so that galvanic separation is possible.

Figure 2:
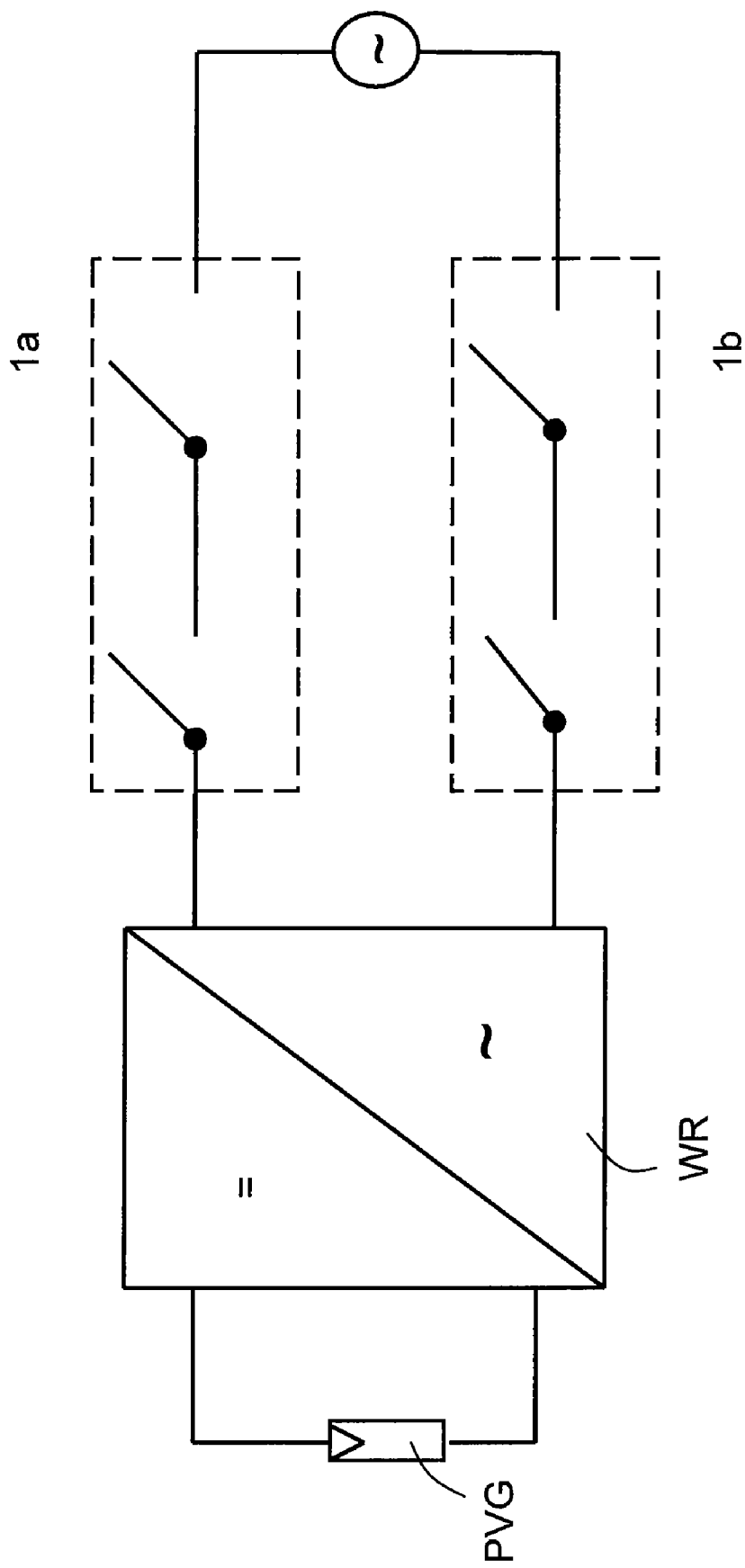
FIG. 2 shows an illustration of an arrangement comparable to FIG. 1, several switch contacts being connected in series.
Figure 3:
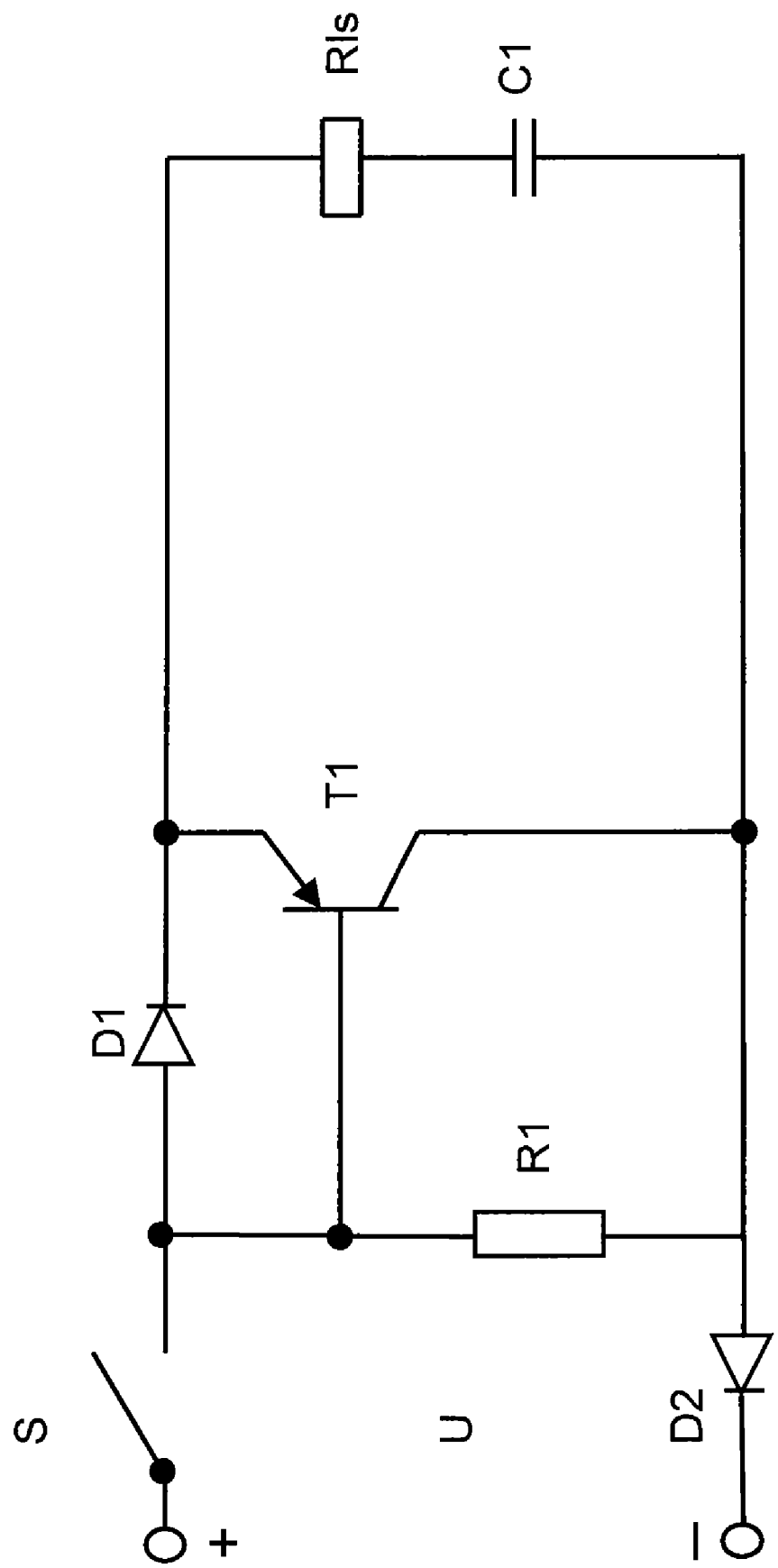
FIG. 3 shows a prior art circuit array.

As shown in FIG. 2, it is possible to implement the circuit array with four relays, with two relays including at least two switch contacts or with one relay incorporating at least four switch contacts. Two respective switch contacts are connected in series so that galvanic separation is ensured upon gluing a contact.

In FIG. 4 a first exemplary embodiment of the circuit array of the invention is illustrated. This trigger circuit allows for using a bistable relay. This is a preferred variant. The circuit array incorporates a field coil E. This coil is connected in series with a switch S1 and with a capacitor C1 so that the capacitor C1 is charged through the field coil E when the switch S1 is switched on.

In the preferred embodiment shown in FIG. 4, a change over switch SC1 switches between the supply voltage Vcc and ground. In the initial position, the change over switch SC1 is connected to ground. By switching SC1 over, a first path with a series connection consisting of the resistors R1, R4 and of one switch S2 is connected to the supply voltage Vcc. Another parallel path, which also is connected to the supply voltage, is formed by the resistors R2, R3, the zener diode D4, the diode D5 and the resistor R5. In another parallel path, which is connected to the supply voltage Vcc, there is the series connection consisting of the switch S11, the field coil E and the capacitor C1, a diode D6 being disposed in a charging path of the capacitor C1. The control input of the switch S2 lies at the point where the diode D5 and the resistor R5 are linked together. A switch S3 is connected between the diode D6 and the resistor R2. Moreover, an antiparallel diode D1 is provided on the switch S1.

Through the series-connected change over switch SC1, it is possible to switch between the supply voltage VCC and ground. The switch SC1 may also be integrated in a driver component, preferably in an IC, and preferably consists of semiconductor switches, in particular of MOSFETs.

Parallel to the switch S1 and to the field coil E of the bistable relay K1 there is the series connection, which consists of a resistor R2, a switch S3 and the diode D6.

Hereinafter, the closing of the relay K1 will be described.
Initially, the capacitor C1 is not charged. If the supply voltage Vcc is applied to the circuit by switching the switch SC1 from ground to Vcc, the switch S3 becomes conductive.

The switch S3 preferably is a MOSFET as shown in FIG. 4. Drain and gate of the switch S3 are joined together through the resistor R3. Between gate and source there is connected a zener diode D9 in such a manner that the cathode of D9 is connected to the gate of S3 and the anode to the source of S3. Through this wiring, the voltage applied to the gate of the switch S3 is increased in a controlled manner when the supply voltage Vcc is applied to the circuit and when the capacitor C1 is not charged.

When the supply voltage Vcc is applied to the circuit, a current flows through the series connection, consisting of the resistor R2, of the switch S3, of the diode D6 and of the capacitor C1. The capacitor C is charged. The maximum voltage over C1 thereby corresponds approximately to the level of the zener diode path of the diode D4 plus the flow voltage of the diode D5 less the threshold voltage gate-source of the switch S3 and the flow voltage of the diode D6. The zener diode voltage of the diode D4 is chosen to be so high that the charge in C1 is high enough for switching off.

If the capacitor C1 is charged, the gate voltage at the switch S3 is so low that the switch S3 blocks. At the same time, the switch S2, which is preferred to be an npn transistor, is increased in a controlled manner through the zener diode D4. As a result, the voltage at the gate of S1 is negative and the switch S1 becomes conductive. The switch S1 preferably is a p channel MOSFET. As a result, a current flows through the coil from the relay K1 so that the relay is capable of switching.

In the charging phase, the resistor R2 acts to limit the current, i.e., the magnitude of the charge current can be set through the resistor R2.

The diode D6 is connected in series between the source of the switch S3 and the capacitor C1 in such a manner that the cathode of D6 is connected to the capacitor C1. The diode D6 prevents current from flowing into the charging path whilst the capacitor C1 discharges. As a result, the charging path is decoupled from the discharging path.

The opening of the relay K1 will be described herein after.
If the change over switch SC1 is again switched to ground by the supply voltage Vcc, the capacitor C1 discharges. The discharge current flows through the field coil E of the relay K1 and through the antiparallel diode D1 of the switch S1. The current flow is contrary to the charge current. As a result, the bistable relay K1 changes over to the initial position.

Preferably, the described array is operated with a driver component part or IC. As a result, the discharge current flows in a driver internal discharge circuit.

The relay K1 opens for example when there is a failure in the mains supply, in the supply voltage Vcc or if maintenance work has to be carried out on the inverter. Suited monitoring or manual devices trigger a signal which causes the switch SC1 to switch over to ground. In the way described, the relay contacts 1a, 1b are opened again. As a result, the inverter WR is disconnected from the power grid N.

FIG. 5 shows another implementation of the circuit array or of the trigger circuit for the bistable relay of the invention.

In the second embodiment the field coil E of the relay K12, a capacitor C12 and a switch SC2 are connected in series.

The major difference between the array as shown in FIG. 5 and the preferred embodiment shown in FIG. 4 is the implementation of the switch SC2 and the current path for the discharge current of the capacitor C12. The switch SC2 is interposed between the capacitor C12 and ground. The discharge current of the capacitor C12 flows through the complementary Darlington circuit consisting of two switches S4 and S5. The switch S32 of the charge current path is in particular an n-channel MOSFET.

The closing of the relay K12 will be described herein after.
The supply voltage Vcc is applied to the circuit through the switch SC2. The switch SC2 preferably is a MOSFET. If the switch SC2 is closed, a current flows through the resistor R22 and through the switch S32 so that the capacitor C12 is charged. A diode D8 and a diode 62 are also connected in series with respect to the resistor R22, the switch S32, the capacitor C12 and the switch SC2.

The anode of the diode D8 is connected to the resistor R22. The cathode of D8 is linked to the collector of the switch S4. The diode D8 prevents current from flowing through the resistor R22 and through D7 during discharging of the capacitor C12 in order to ensure clean controlled current increase of the Darlington circuit.

The diode 62 is connected in series between the source of the switch S32 and the capacitor C12 in such a manner that the cathode is connected to the capacitor C12. The diode D62 prevents current from flowing into the charging path during the discharging of the capacitor. The charging path is thus decoupled from the discharging path.

The resistor R22 also limits the current during the charging phase, i.e., the magnitude of the load current can be set through R22.

The level of the capacitor voltage, which occurs with the charging process, adjusts to the selected level of the zener diode D42 plus the flow voltage of D52. The capacitor C12 is at first charged to this level, less the threshold voltage gate-source of the switch S32 and the flow voltage of D62, then, the very switch S32 blocks itself. It is preferred that the switch S32 is a MOSFET.

If the switch S32 blocks, a current flows through the field coil of K12 and the rotating armature tilts. The relay is closed.

Herein after, the opening of relay K12 will be described.

If the switch SC2 is opened, the charge current circuit is interrupted. The base of the pnp transistor S4 adopts emitter level through the resistors R6 and R7. The complementary Darlington circuit, which consists of the switches S4 and S5, is conductive. As a result, the capacitor C12 is discharged through the field coil of K12. The rotating armature of the relay tilts and the relay opens.

After defined pre-charging, the capacitor charge C1 or C12 is high enough to open the relay contacts 1a, 1b when it is desired or necessary to disconnect the grid.

The invention is not limited to these examples. The switch SC2 may also be interposed between the supply voltage VCC and R22. Circuit features of the circuit in FIG. 4 may very well be combined with features of the circuit shown in FIG. 5. In its position before R22, the switch SC2 may for example be configured as a change over switch between the supply voltage VCC and ground.

Relay is also understood to refer to comparable switching equipment or switch components with switch contacts such as a contactor.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A circuit array with a relay incorporating a field coil as well as a switch contact, said switch contact being provided as a switch point between a grid, and an inverter fed by a direct voltage source, wherein the relay is configured to be a bistable relay, and wherein the field coil is connected in series with a switch and a capacitor so that the field coil is energized when closing the switch, and further comprising a charge current path for charging the capacitor, wherein the charge current path is in parallel with the field coil, thereby facilitating a charging of the capacitor via the charge current path without energizing the field coil.

2. The circuit array as set forth in claim 1, and further comprising a second switch disposed in the charge current path, wherein said second switch is configured to interrupt current in said charge current path when the capacitor has charged to a defined value.

3. The circuit array as set forth in claim 1, further comprising a trigger circuit, comprising at least one zener diode, which is connected to an additional switch for controlling the charging of the capacitor.

4. The circuit array as set forth in claim 1, further comprising a trigger circuit is configured to apply a trigger signal to the switch so that the switch, which is connected in series with the field coil, is only switched on when the capacitor is charged to the defined value.

5. The circuit array as set forth in claim 1, further comprising a change over switch for switching between a supply voltage and ground, wherein the change over switch is connected in series with the switch, the field coil and the capacitor, respectively.

6. The circuit array as set forth in claim 5, wherein the change over switch, which is connected in series with the field coil, is integrated in an IC driver component part.

7. The circuit array as set forth in claim 1, wherein a series connection, which comprises a resistor, an additional switch and a diode, is connected in parallel to the switch and to the field coil.

8. The circuit array as set forth in claim 1, wherein the switch is triggered through a semiconductor switch, which is triggered through another zener diode, said zener diode being connected to a gate of another switch lying in the charge current path.

9. The circuit array as set forth in claim 1, wherein the switch is a p channel MOSFET.

10. The circuit array as set forth in claim 1, wherein the switch, which is connected in series with the field coil (E), is a semiconductor switch.

11. The circuit array as set forth in claim 10, further comprising a series connection, which comprises an additional switch and a diode, connected in parallel to the field coil.

12. The circuit array as set forth in claim 1, further comprising a complementary Darlington circuit comprising two switches configured to provide a discharge path for a discharge current of the capacitor.

13. The circuit array as set forth in claim 12, further comprising a resistor connected in series with a diode and the field coil, wherein a cathode of the diode is connected to a terminal of a first switch of the Darlington circuit.

14. The circuit array as set forth in claim 11, wherein the additional switch, which is connected to the zener diode, is a semiconductor switch, a drain and a gate of the additional switch being connected together through a resistor and a zener diode being connected between the gate and a source in such a manner that the cathode of the diode is connected to the gate and an anode of the diode to the source.

15. A method of decoupling an inverter from a grid, comprising:
    activating a first current path to charge a capacitor;
    activating a second current path parallel to the first current path after the capacitor has charged to a predetermined level, wherein the activation of the second current path energizes a field coil therein, thereby closing a relay operably associated with the field coil; and
    discharging the capacitor through the second current path, thereby causing the field coil to open the relay.

16. The method of claim 15, wherein activating the first current path comprises activating a switch in the first current path, thereby delivering a current through the switch to the capacitor, resulting in a charging thereof.

17. The method of claim 15, wherein activating the second current path comprises activating a switch in the second current path that is in series with the field coil, thereby delivering a current to the field coil for energizing thereof.

18. The method of claim 17, wherein discharging the capacitor through the second current path comprises coupling a portion of the second current path to a potential less than a potential across the capacitor, and discharging the capacitor through a diode coupled in parallel with the switch in the second current path.

19. A grid disconnection arrangement comprising:
a bistable relay with a field coil and a switch contact;
a capacitor connected in series to the field coil; and
a switchable bypass parallel to the field coil, the bypass being configured to provide a current path to precharge the capacitor to a predetermined level, and to open the current path when the predetermined level is reached,
wherein the grid disconnection arrangement is configured to continue to charge the capacitor via the field coil after the current path is open, thereby actuating the bistable relay.

20. The grid disconnection arrangement of claim 19, further comprising a switch connected in series with the field coil, and configured to close after the capacitor is precharged to the predetermined level via the current path, thereby creating another current path through the field coil and capacitor to actuate the bistable relay and continue to charge the capacitor.

* * * * *